US005557466A

United States Patent [19]
Otani et al.

[11] Patent Number: 5,557,466
[45] Date of Patent: Sep. 17, 1996

[54] TWO-WAVELENGTH ANTIREFLECTION FILM

[75] Inventors: Minoru Otani; Junri Ishikura, both of Utsunomiya, Japan

[73] Assignee: Canon Kabushiki Kaisha, Tokyo, Japan

[21] Appl. No.: 299,402

[22] Filed: Sep. 1, 1994

[30] Foreign Application Priority Data

Sep. 7, 1993 [JP] Japan .................. 5-246445

[51] Int. Cl.$^6$ .................. G02B 1/10; G02B 5/28
[52] U.S. Cl. .................. 359/586; 359/580; 359/588; 359/589
[58] Field of Search .................. 359/580, 584, 359/586, 588, 589

[56] References Cited

U.S. PATENT DOCUMENTS

| | | | |
|---|---|---|---|
| 2,397,929 | 4/1946 | Dimmick | 359/588 |
| 3,781,090 | 12/1973 | Sumita | 359/588 |
| 3,829,197 | 8/1974 | Thelen | 359/588 |
| 3,833,368 | 9/1974 | Land et al. | 359/588 |
| 3,858,965 | 1/1975 | Sumita | 359/588 |
| 4,370,027 | 1/1983 | Sato et al. | 359/588 |
| 4,726,654 | 2/1988 | Kimura et al. | 359/588 |
| 5,216,542 | 6/1993 | Szczyrbowski et al. | 359/588 |
| 5,267,081 | 11/1993 | Pein | 359/588 |
| 5,333,090 | 7/1994 | Baumeister et al. | 359/589 |

FOREIGN PATENT DOCUMENTS

| | | |
|---|---|---|
| 1167701 | 7/1989 | Japan . |
| 2127601 | 5/1990 | Japan . |
| 2247601 | 10/1990 | Japan . |
| 4333834 | 11/1992 | Japan . |

OTHER PUBLICATIONS

Thin–Film Optical Filters, H. A. Macleod, Macmillan Publishing Co., New York, p. 126 (1969).
Thin–Film Optical Filters, H. A. Macleod, American Elsevier Publishing Co., New York, pp. 126–129 (1969).

Primary Examiner—Paul M. Dzierzynski
Assistant Examiner—Darren E. Schuberg
Attorney, Agent, or Firm—Fitzpatrick, Cella, Harper & Scinto

[57] ABSTRACT

A two-wavelength antireflection film is constituted by a multi-layered film provided on a substrate so as to have antireflection characteristics for a wavelength $\lambda_1$ and a wavelength $\lambda_2$ different from the wavelength $\lambda_1$. Each of the materials constituting the multi-layered film has a refractive index not exceeding 1.7 for a central wavelength $\lambda_0$ which is defined by

$$2/\lambda_0 = 1/\lambda_1 + 1/\lambda_2.$$

The materials constituting the multi-layered film are $Al_2O_3$, $SiO_2$ and $MgF_2$, or $Al_2O_3$ and $MgF_2$. Each of plural films constituting the multi-layered film has an optical thickness equal to ¼ of the central wavelength $\lambda_0$.

4 Claims, 8 Drawing Sheets

TWO-WAVELENGTH ANTIREFLECTION FILM

BACKGROUND OF THE INVENTION

1. Field of the Invention

The present invention relates to a two-wavelength antireflection film, for preventing reflection of high-power light of two different wavelengths, such as a fundamental beam and a 2nd harmonic beam of various lasers.

2. Related Background Art

As a two-wavelength antireflection film for preventing reflection of high-power light of two different wavelengths, such as a fundamental beam and a 2nd harmonic beam of various lasers, there are already known, for example, a two-wavelength antireflection film consisting of a three-layered film of a $\lambda/4$ film of a refractive index of 1.82, a $\lambda/4$ film of a refractive index of 1.585 and a $\lambda/4$ film of a refractive index of 1.38 ($\lambda=707$ nm) formed on a substrate of a refractive index of 1.52, for preventing the reflection of the fundamental beam (wavelength 1064 nm) and the 2nd harmonic beam (wavelength 532 nm) of a Nd:YAG laser (cf. THIN-FILM OPTICAL FILTERS 2nd Edition; H. A. Macleod, Macmillan Publishing Company, NY, p. 126), a wavelength converting element KTP ($KTiOPO_4$ crystal with a refractive index of 1.7 to 1.85 in the visible region) provided with a two-wavelength antireflective film for preventing the reflection of fundamental beam and 2nd harmonic beam of Nd:YAG laser (cf. Japanese Patent Laid-Open Application Nos. 2- 247601 and 4-333834), and a combination of two multi-layered films capable of antireflection respectively for two different lights, with inclusion of a non-interference layer for avoiding any influence to the antireflective property of either film (cf. Japanese Patent Laid-Open Application Nos. 2-127601 and 1 -167701). These employ a highly refractive material with a refractive index exceeding 1.7 such as $Y_2O_3$ or $TiO_2$ in a layer contained in three- to five-layered film, and such highly refractive material tends to be not sufficiently resistant for the high-power light such as laser beam, because of the generally high absorbance.

The above-mentioned conventional technologies show very low durability to high-power laser beam, because, as mentioned above, they employ a highly refractive material of a high absorbance in a part of the multi-layered film of three to five layers. Also, the production cost becomes high because of complication of the manufacturing process, in case the number of layers increases to as many as five, and particularly if the layers have respectively different optical thicknesses.

SUMMARY OF THE INVENTION

In consideration of the above-mentioned drawbacks of the conventional technologies, the object of the present invention is to provide an inexpensive two-wavelength antireflection film excellent in durability to the high-power light such as laser beam.

The above-mentioned object can be attained, according to the present invention, by a two-wavelength antireflection film comprising a multi-layered film provided on a substrate, wherein said multi-layered film is composed of plural thin films having a same predetermined optical thickness or, in a part of said films, an integral multiple of said predetermined optical thickness, and each of said thin films is composed of a material of a refractive index not exceeding 1.7.

The above-mentioned thin films are preferably composed of $Al_2O_3$, $SiO_2$ and $MgF_2$, or of $Al_2O_3$ and $MgF_2$.

Also the above-mentioned predetermined optical thickness is preferably equal to ¼ of the central wavelength, calculated from two different wavelengths.

The two-wavelength antireflection film of the present invention reduces the light absorption, by employing materials of refractive indexes not exceeding 1.7 for the thin films constituting the multi-layered film, thereby improving the durability to the high-power laser beam or the like. A two-wavelength antireflection film of excellent antireflective characteristics to the lights of two different wavelengths, by employing a combination of $Al_2O_3$, $SiO_2$ and $MgF_2$ or a combination of $Al_2O_3$ and $MgF_2$ for the thin film. Also, the manufacturing process is not complicated because the optical thickness of each thin film is selected as a predetermined value or an integral multiple thereof.

DESCRIPTION OF THE PREFERRED EMBODIMENTS

In the following there will be explained the structure of the two-wavelength antireflection film of the present invention.

[1st Embodiment]

Figure 1:
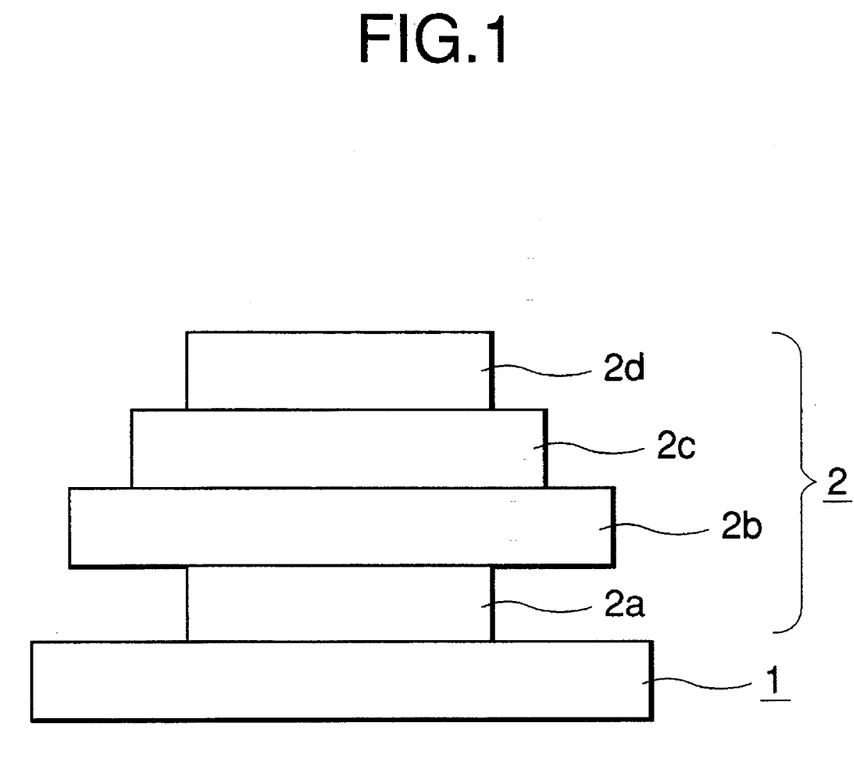
FIG. 1 is a schematic cross-sectional view of a first embodiment of the present invention.

FIG. 1 illustrates a first embodiment of the two-wavelength antireflection film composed, on a substrate 1 of BK7 glass (having a refractive index of 1.512 for the central wavelength $\lambda_0$), of a four-layered film 2 consisting of a first layer 2a of a thin $MgF_2$ film (having a refractive index of 1.378 for the central wavelength $\lambda_0$), a second layer 2b of a thin $Al_2O_3$ film (having a refractive index of 1.615 for the central wavelength $\lambda_0$), a third layer 2c of a thin $SiO_2$ film (having a refractive index of 1.463 for the central wavelength $\lambda_0$), and a fourth layer 2d of a thin $MgF_2$ film (having a refractive index of 1.378 for the central wavelength $\lambda_0$), wherein each of the above-mentioned layers has an optical thickness (nd) of 177.4 nm, corresponding to ¼ of the central wavelength $\lambda_0$ (709.3 nm). The central wavelength $\lambda_0$ is determined from the wavelength $\lambda_1$ (1064 nm) of the fundamental beam and the wavelength $\lambda_2$ (532 nm) of the 2nd harmonic beam of Nd:YAG laser, according to the following equation:

$$2/\lambda_0 = 1/\lambda_1 + 1/\lambda_2 \tag{1}$$

The above-mentioned layers were formed by vacuum evaporation under and heating of the substrate to 200° C.

Figure 2:
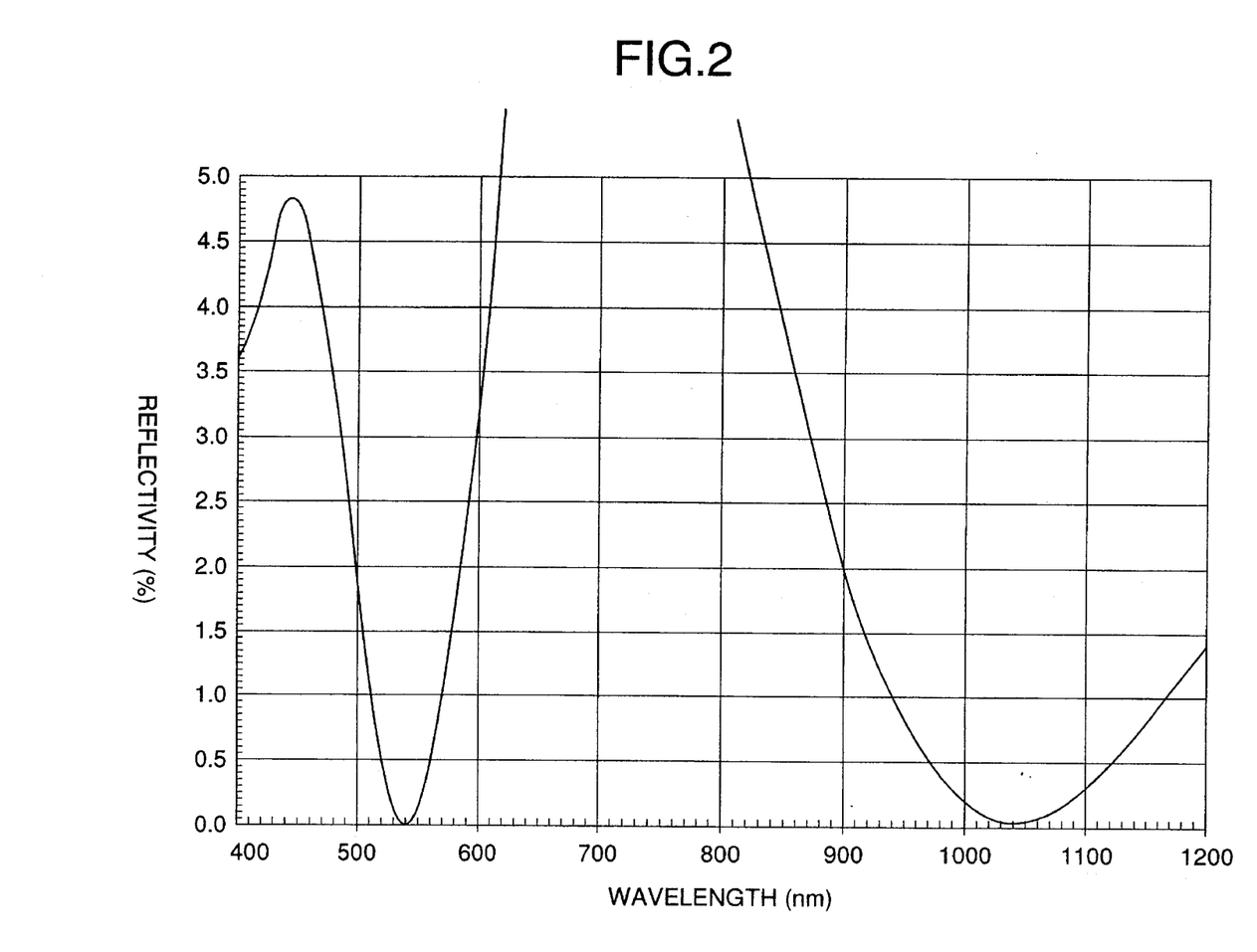
FIG. 2 is a chart showing spectral reflectivity of the first embodiment.

FIG. 2 shows the result of measurement of the spectral reflectivity of the two-wavelength antireflection film of the present invention. As will be apparent from this chart, the two-wavelength antireflection film has excellent antireflection characteristics, showing reflectivities not exceeding 0.2% at the wavelengths 1064 nm and 532 nm, respectively corresponding to the fundamental beam and the 2nd harmonic beam of Nd:YAG laser. Also the laser damage threshold of the two-wavelength antireflection film of the present embodiment, measured with a pulsed Nd:YAG laser (pulse width 1 ns), was as extremely high as 10.5 J/cm$^2$ for the fundamental beam (1064 nm) and 9.3 J/cm$^2$ for the 2nd harmonic beam (532 nm).

The two-wavelength antireflection film of the present invention is particularly adapted for use in the window of a wavelength converting element such as of KDP crystal, or in the lenses for an optical system used in common for two wavelengths after wavelength conversion.

The two-wavelength antireflection film of the present embodiment exhibits antireflective property also for the following two wavelengths of 266 nm and 212.7 nm, of which central wavelength corresponds to ⅓ of the above-mentioned central wavelength $\lambda_0$ (709.3 nm). Said wavelength 266 nm, corresponds to that of the 4th harmonic beam of the Nd:YAG laser, so that the two-wavelength antireflection film of the present embodiment may also be used as a three-wavelength antireflection film having excellent antireflective characteristics for the fundamental beam, the 2nd harmonic beam and the 4th harmonic beam of the above-mentioned laser. However, since the antireflection characteristics for the 4th harmonic beam are limited to an extremely narrow wavelength range, a highly precise film thickness control is required in the film forming operation. Therefore, as a variation of the present embodiment, a four-layered film similar to that in the present embodiment was formed in a synthetic quartz substrate, having a high transmittance to the ultraviolet region.

Figure 3:
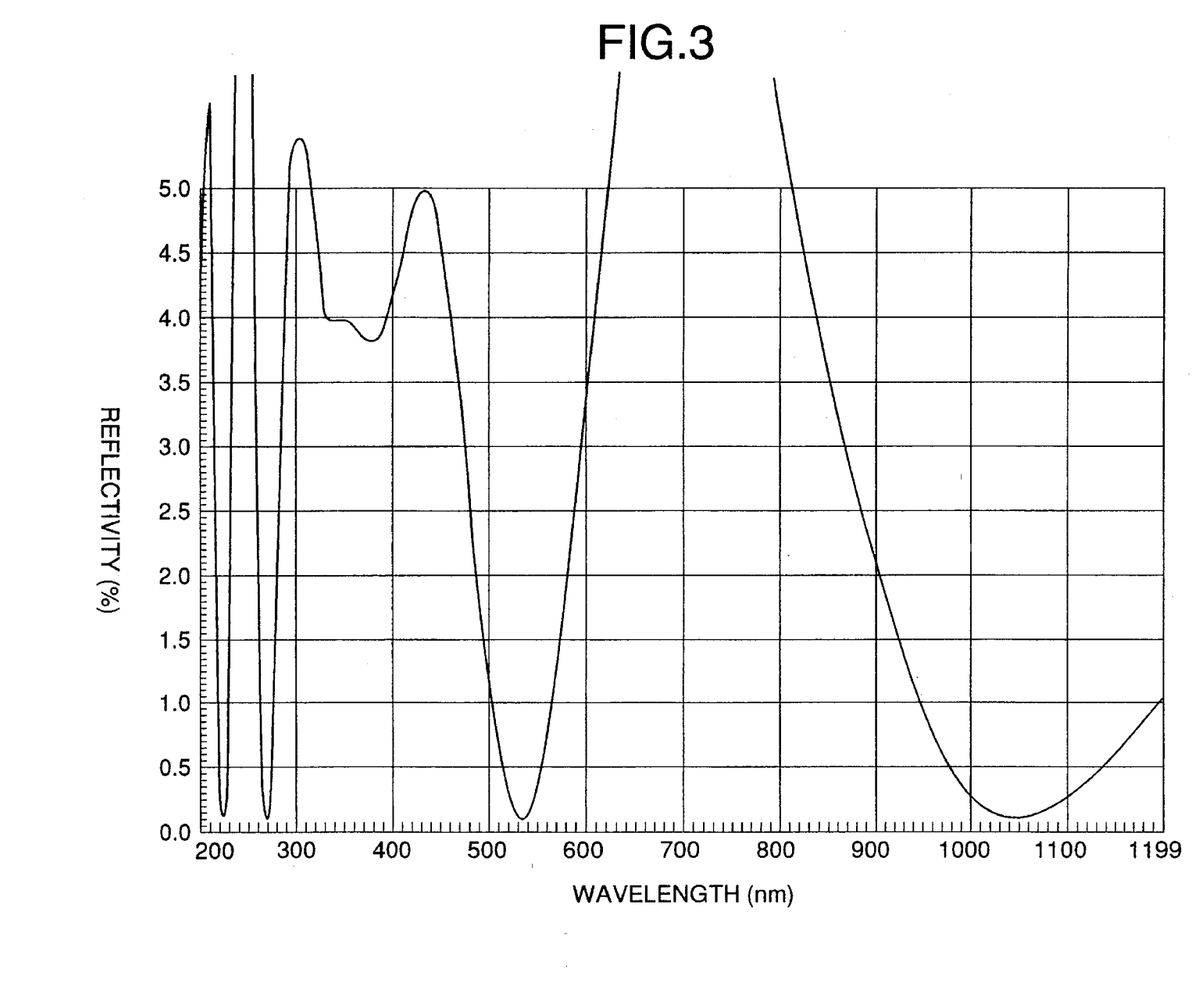
FIG. 3 is a chart showing spectral reflectivity of a variation of the first embodiment.

The spectral transmittance measured to the two-wavelength antireflection film of this variation is shown in FIG. 3. As will be apparent from this chart, the two-wavelength antireflection film of this variation has a reflectivity not exceeding 0.6% also for the 4th harmonic beam (266 nm) of Nd:YAG laser and can thus be regarded as a three-wavelength antireflection film having excellent antireflective characteristics for the fundamental beam, 2nd harmonic beam and 4th harmonic beam.

[2nd Embodiment]

A three-layered film consisting of a first layer of a thin $Al_2O_3$ film (having a refractive index of 1.615 for the central wavelength $\lambda_0$), a second layer of a thin $SiO_2$ film (having a refractive index of 1.463 for the central wavelength $\lambda_0$) and a third layer of a thin $MgF_2$ film (having a refractive index of 1.378 for the central wavelength $\lambda_0$) was formed respectively on a substrate of BK7 glass (having a refractive index of 1.512 for the central wavelength $\lambda_0$) as a sample A, and on a substrate of synthetic quarts (having a refractive index of 1.463 for the central wavelength $\lambda_0$) as a sample B. In both samples A and B, each of the layers of the three-layered film had an optical thickness (nd) of 177.4 nm, corresponding to ¼ of the central wavelength $\lambda_0$ (709.3 nm), as in the first embodiment.

Figure 4:
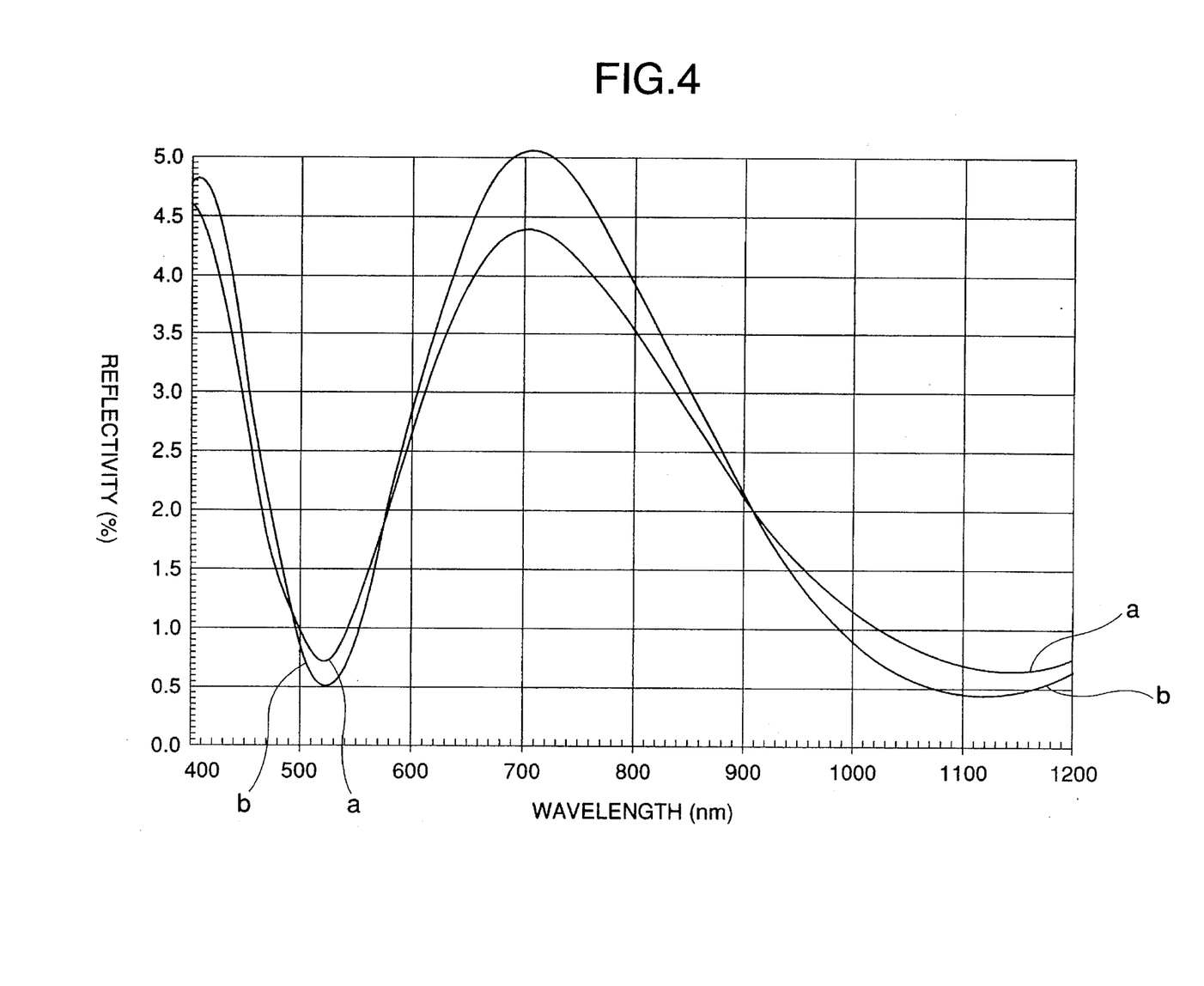
FIG. 4 is a chart showing spectral reflectivities of samples A and B of a second embodiment.

FIG. 4 shows the spectral reflectivities of said samples A and B, respectively by curves a and b. As will be apparent from this chart, the sample B utilizing the synthetic quartz substrate has reflectivities not exceeding 0.6% for the fundamental beam (1064 nm) and the 2nd harmonic beam (532 nm) of the Nd:YAG laser, but the sample A utilizing the BK glass substrate shows reflectivities of about 0.8%.

Then, as a two-wavelength antireflection film superior in antireflective characteristics to the above-mentioned samples A and B, a three-layered film consisting of a first layer of a thin $MgF_2$ film (having a refractive index of 1.378 for the central wavelength $\lambda_0$), a second layer of a thin $Al_2O_3$ film (having a refractive index of 1.615 for the central wavelength $\lambda_0$) and a third layer of a thin $MgF_2$ film (having a refractive index of 1.378 for the central wavelength $\lambda_0$) was formed respectively on a substrate of BK7 glass (having a refractive index of 1.512 for the central wavelength $\lambda_0$) as a sample C and a substrate of synthetic quartz (having a refractive index of 1.463 for the central wavelength $\lambda_0$) as a sample D. In both samples C and D, each of the first and second layers of the three-layered film had an optical thickness (nd) of 354.6 nm, corresponding to ½ of the central wavelength $\lambda_0$ (709.3 nm), while the third layer had an optical thickness of 177.4 nm, corresponding to ¼ of said central wavelength.

Figure 5:
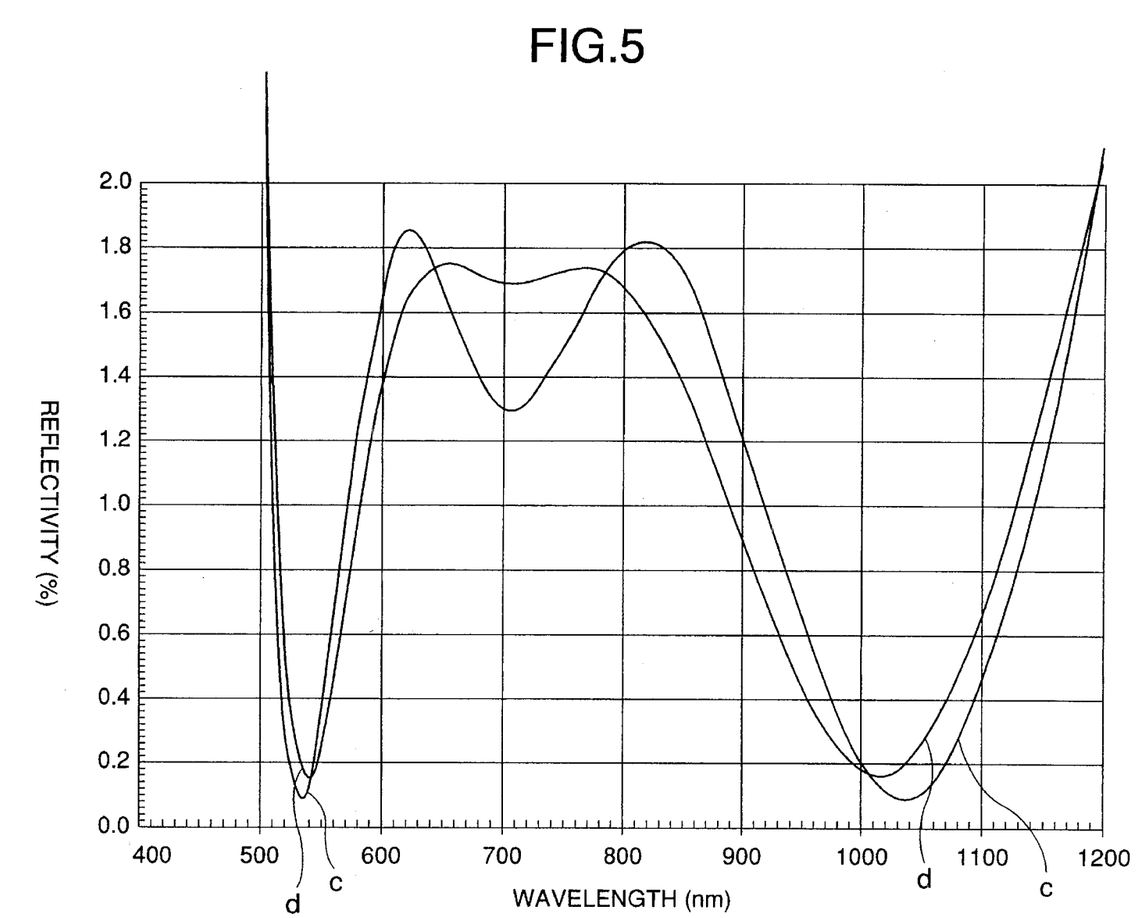
FIG. 5 is a chart showing spectral reflectivity of samples C and D of the second embodiment.

FIG. 5 shows the spectral reflectivities of said samples C and D, respectively by curves c and d. As will be apparent from this chart, the sample C shows reflectivities not exceeding 0.2% at the wavelength $\lambda_1$ (1064 nm) of the fundamental beam and the wavelength $\lambda_2$ (532 nm) of the 2nd harmonic beam of the Nd:YAG laser, while the sample D also has reflectivities not exceeding 0.3% at these wavelengths, so that they are excellent two-wavelength antireflection films. In this manner sufficient antireflective characteristics can be obtained for two wavelengths, even with a three-layered film, by selecting a suitable combination of the materials. Also, the laser damage threshold of the samples A to D, measured with a pulsed Nd:YAG laser (pulse width 1 ns), was found to be extremely high, in the level of about 11 J/cm$^2$ for the fundamental beam and about 10 J/cm$^2$ for the 2nd harmonic beam, as shown in Table 1. Each of $Al_2O_3$, $SiO_2$ and $MgF_2$ shows an extremely high laser damage threshold in a single-layered film.

TABLE 1

| | Nd: YAG laser (pulse width 1 ns) | |
|---|---|---|
| | Laser damage threshold (J/cm$^2$) | |
| | Fundamental beam (1064 nm) | 2nd harmonic beam (532 nm) |
| [Samples A, B] Sub./$Al_2O_3$/$SiO_2$/$MgF_2$/air $\lambda_0/4 - \lambda_0/4 - \lambda_0/4$ | 11.0 | 10.0 |
| [Samples C, D] Sub./$MgF_2$/$Al_2O_3$/$MgF_2$/air $\lambda_0/2 - \lambda_0/2 - \lambda_0/4$ | 11.8 | 9.7 |

[Third Embodiment]

Figure 6:
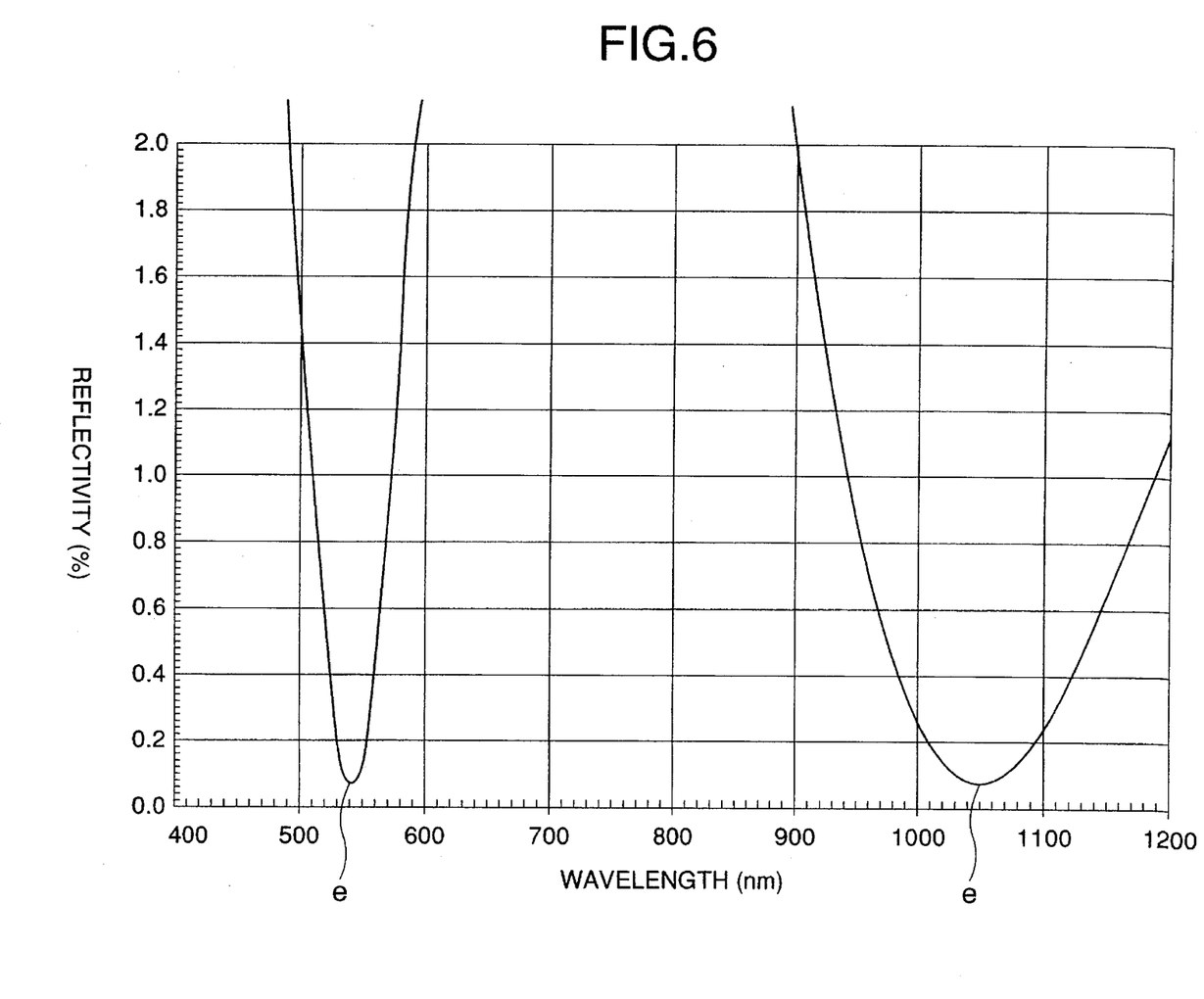
FIG. 6 is a chart showing spectral reflectivity of a sample E of a third embodiment.
Figure 7:
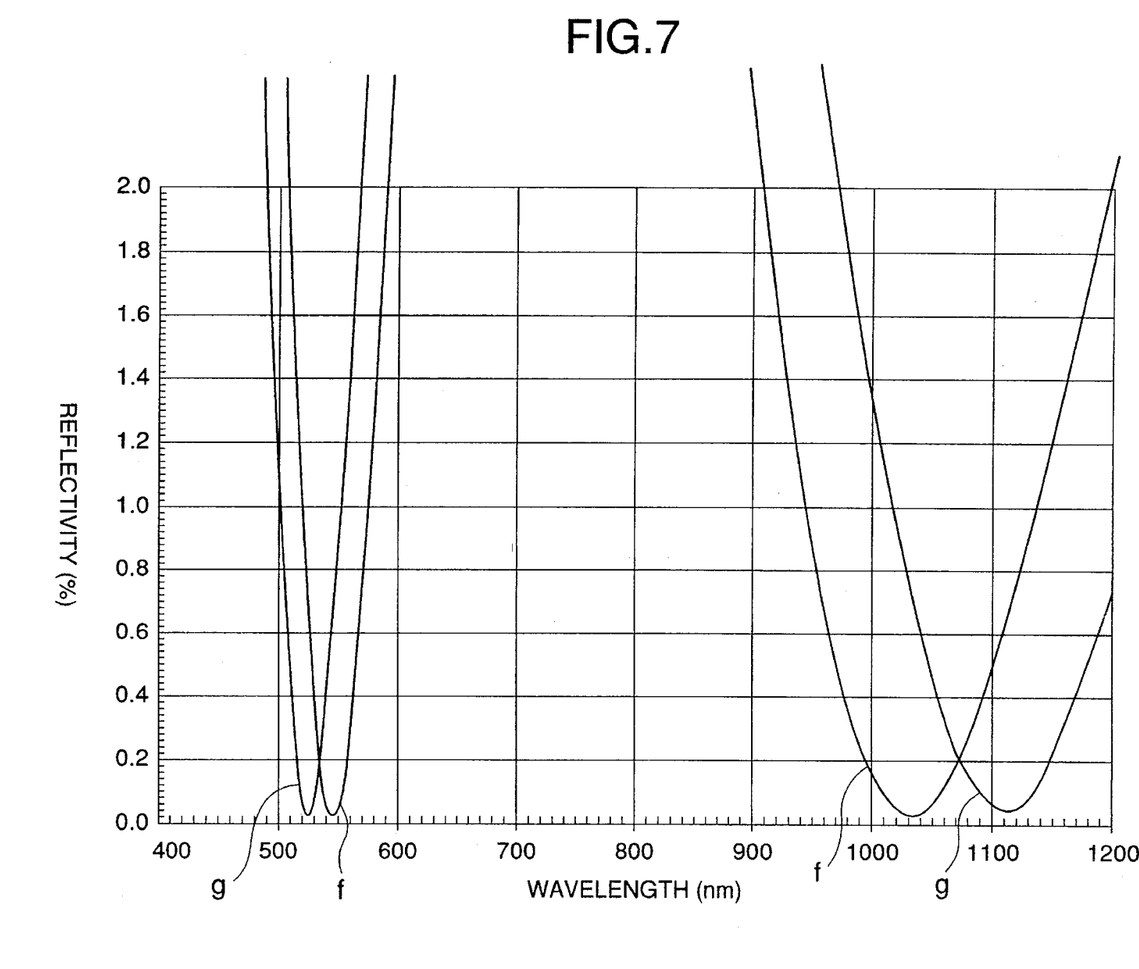
FIG. 7 is a chart showing spectral reflectivities of samples F and G of the third embodiment.
Figure 8:
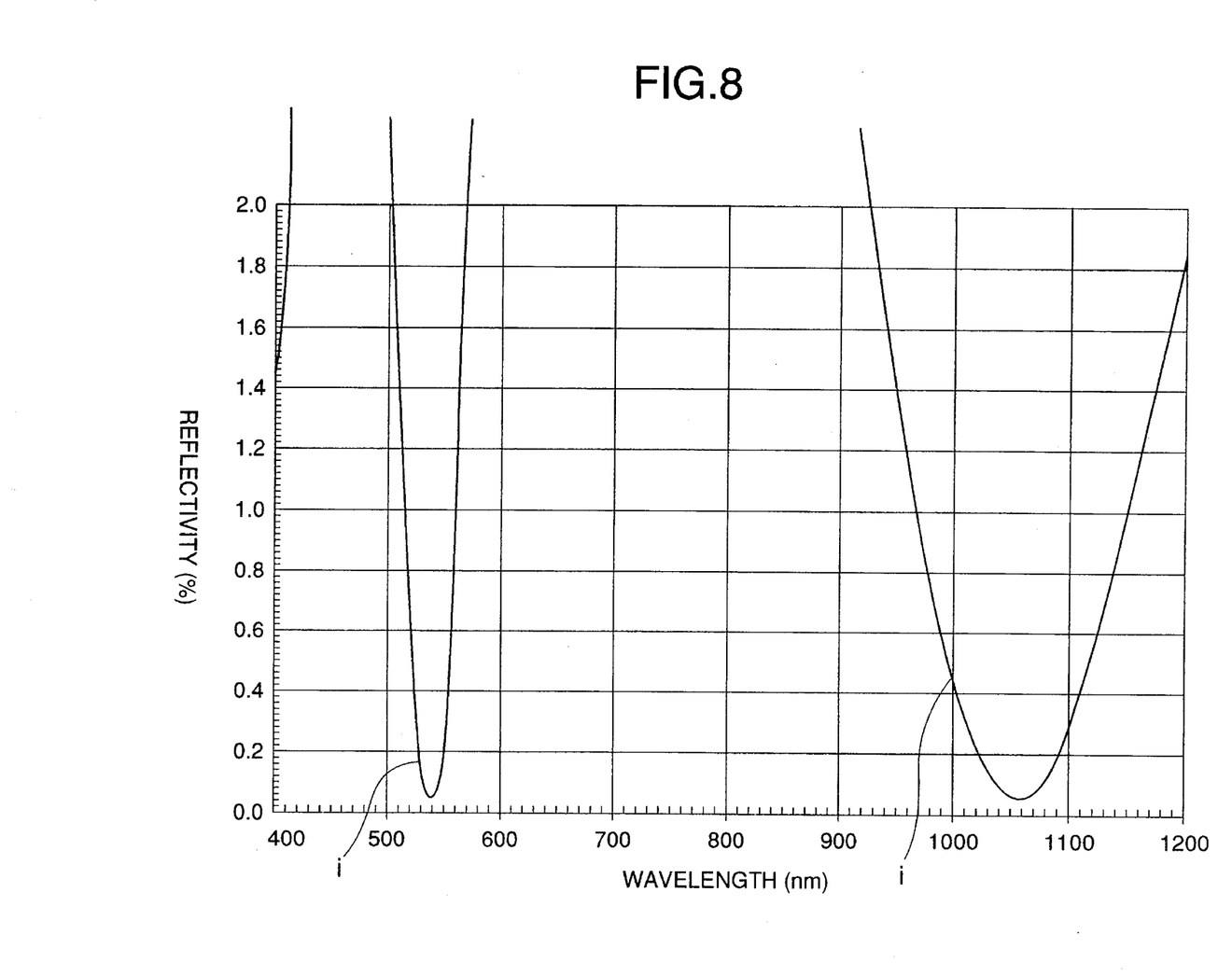
FIG. 8 is a chart showing spectral reflectivity of a sample I of the third embodiment.

On three substrates of different refractive indexes, a four- or five-layered two-wavelength antireflection film was formed according to the refractive index. A sample E was prepared by forming, on a $KD_2PO_4$ crystal (DKDP), which is a non-linear optical material employed in the wavelength converting element for the laser beam, a four-layered film consisting of a first layer of a thin $MgF_2$ film (having a refractive index of 1.378 for the central wavelength $\lambda_0$), a second layer of a thin $Al_2O_3$ film (having a refractive index of 1.615 for the central wavelength $\lambda_0$), a third layer of a thin $SiO_2$ film (having a refractive index of 1.463 for the central wavelength $\lambda_0$), and a fourth layer of a thin $MgF_2$ film (having a refractive index of 1.378 for the central wavelength $\lambda_0$), as in the first embodiment. The $KD_2PD_4$ crystal has a refractive index of 1.47 for the 2nd harmonic beam (532 nm) of Nd:YAG laser, and each layer had an optical thickness (nd) of ¼ of the central wavelength $\lambda_0$ (709.3 nm). Also a sample F was prepared by forming, on $\beta$-$BaB_2O_4$ crystal (BBO), a five-layered film consisting of a first layer of a thin $Al_2O_3$ film (having a refractive index of 1.615 for the central wavelength $\lambda_0$), a second layer of a thin $MgF_2$ film (having a refractive index of 1.378 for the central wavelength $\lambda_0$), a third layer of a thin $Al_2O_3$ film (having a refractive index of 1.615 for the central wavelength $\lambda_0$), a fourth layer of a thin $SiO_2$ layer (having a refractive index of 1.463 for the central wavelength $\lambda_0$), and a fifth layer of a thin $MgF_2$ film (having a refractive index of 1.378 for the central wavelength $\lambda_0$). The $\beta$-$BaB_2O_4$ crystal has a refractive index of 1.66 for the above-mentioned 2nd harmonic beam (532 nm), and each layer had an optical thickness (nd) of ¼ of the central wavelength $\lambda_0$ (709.3 nm), as in the sample E. A sample G was prepared by forming, also on $\beta$-$BaB_2O_4$ crystal, a five-layered film consisting of a first layer of a thin $SiO_2$ film (refractive index 1.463 for the central wavelength $\lambda_0$), a second layer of a thin $MgF_2$ film (refractive index 1.378 for the central wavelength $\lambda_0$), a third layer of a thin $Al_2O_3$ film (refractive index 1.615 for the central wavelength $\lambda_0$), a fourth layer of a thin $SiO_2$ film (refractive index 1.463 for the central wavelength $\lambda_0$), and fifth layer of a thin $MgF_2$ (refractive index 1.378 for the central wavelength $\lambda_0$). Each layer had an optical thickness (nd) of ¼ of the central wavelength $\lambda_0$ as in the samples E and F. Also a sample I was prepared by forming, $KTiOPO_4$ crystal (KTP), a five-layered film consisting of a first layer of a thin $Al_2O_3$ film (refractive index 1.615 for the central wavelength $\lambda_0$), a second layer of a thin $MgF_2$ film (refractive index 1.378 for the central wavelength $\lambda_0$), a third layer of a thin $Al_2O_3$ film (refractive index 1.615 for the central wavelength $\lambda_0$), a fourth layer of a thin $SiO_2$ film (refractive index 1.463 for the central wavelength $\lambda_0$), and a fifth layer of a thin $MgF_2$ film (refractive index 1.378 for the central wavelength $\lambda_0$). The $KTiOPO_4$ crystal has a refractive index of 1.78 for said 2nd harmonic beam (532 nm), and each layer had an optical thickness (nd) of ¼ of the central wavelength $\lambda_0$ (709.3 nm), as in the samples E to G. The spectral reflectivity of the sample E is shown by a curve e in FIG. 6; those of the samples F, G are shown by curves f, g in FIG. 7; and that of the sample I is shown by a curve i in FIG. 8. These samples showed reflectivities not exceeding 0.3% for the fundamental beam (1064 nm) and the 2nd harmonic beam (532 nm) of Nd:YAG laser as shown in Table 2, and were therefore found to be excellent two-wavelength antireflection films.

TABLE 2

| | Reflectivity (%) | |
|---|---|---|
| | Fundamental beam (1064 nm) | 2nd harmonic beam (532 nm) |
| [Sample E] DKDP /$MgF_2$/$Al_2O_3$/$SiO_2$/$MgF_2$/air (1.47) $\lambda_0$/4 – $\lambda_0$/4 – $\lambda_0$/4 – $\lambda_0$/4 | 0.1 | 0.1 |
| [Sample F] | | |
| BBO /$Al_2O_3$/$MgF_2$/$Al_2O_3$/$SiO_2$/$MgF_2$/air (1.66) $\lambda_0$/4 – $\lambda_0$/4 – $\lambda_0$/4 – $\lambda_0$/4 – $\lambda_0$/4 | 0.2 | 0.3 |
| BBO /$SiO_2$/$MgF_2$/$Al_2O_3$/$SiO_2$/$MgF_2$/air (1.66) $\lambda_0$/4 – $\lambda_0$/4 – $\lambda_0$/4 – $\lambda_0$/4 – $\lambda_0$/4 | 0.3 | 0.2 |
| [Sample I] KTP /$Al_2O_3$/$MgF_2$/$Al_2O_3$/$SiO_2$/$MgF_2$/air (1.78) $\lambda_0$/4 – $\lambda_0$/4 – $\lambda_0$/4 – $\lambda_0$/4 – $\lambda_0$/4 | 0.1 | 0.1 |

The laser damage threshold of the samples E to I were experimentally shown as extremely high as in the four- and three-layered films of the first and second embodiments. The refractive index of the substrates of the present embodiment is within a range of 1.47 to 1.78, but the result of a computer simulation showed that a two-wavelength antireflection film of excellent antireflective property as those in the present embodiment can be obtained if the refractive index of the substrate is within a range from 1.38 to 1.85.

The present invention, owing to the configuration explained in the foregoing, can provide an inexpensive two-wavelength antireflection film with excellent durability to high-power light such as laser beam.

What is claimed is:

1. A two-wavelength antireflection film having antireflective characteristics for a wavelength $\lambda_1$ and a wavelength $\lambda_2$ different from the wavelength $\lambda_1$, comprising:

a multi-layered film provided on a substrate;

wherein each of the materials constituting said multi-layered film has a refractive index not exceeding 1.7 for a central wavelength $\lambda_0$, which is defined by the following relation:

$2/\lambda_0 = 1/\lambda_1 + 1/\lambda_2$;

and wherein said multi-layered film is a three-layered film consisting, in the order from the surface of said substrate, of films of $MgF_2$, $Al_2O_3$ and $MgF_2$, with respective optical thicknesses of ½, ½ and ¼ of said central wavelength.

2. A two-wavelength antireflection film having antireflective characteristics for a wavelength $\lambda_1$ and a wavelength $\lambda_2$ different from the wavelength $\lambda_1$, comprising:

a multi-layered film provided on a substrate;

wherein each of the materials constituting said multi-layered film has a refractive index not exceeding 1.7 for a central wavelength $\lambda_0$, which is defined by the following relation:

$2/\lambda_0 = 1/\lambda_1 + 1/\lambda_2$;

and wherein said multi-layered film is a four-layered film consisting, in the order from the surface of said substrate, of films of $MgF_2$, $Al_2O_3$, $SiO_2$ and $MgF_2$, with a respective optical thicknesses of ¼ of said central wavelength $\lambda_0$.

3. A two-wavelength antireflection film having antireflective characteristics for a wavelength $\lambda_1$ and a wavelength $\lambda_2$ different from the wavelength $\lambda_1$, comprising:

a multi-layered film provided on a substrate;

wherein each of the materials constituting said multi-layered film has a refractive index not exceeding 1.7 for a central wavelength $\lambda_0$, which is defined by the following relation:

$$2/\lambda_0 = 1/\lambda_1 + 1/\lambda_2;$$

and wherein said multi-layered film is a five-layered film consisting, in the order from the surface of said substrate, of films of $Al_2O_3$, $MgF_2$, $Al_2O_3$, $SiO_2$ and $MgF_2$, with a respective optical thicknesses of ¼ of said central wavelength $\lambda_0$.

4. A two-wavelength antireflection film having antireflective characteristics for a wavelength $\lambda_1$ and a wavelength $\lambda_2$ different from the wavelength $\lambda_1$, comprising:

a multi-layered film provided on a substrate;

wherein each of the materials constituting said multi-layered film has a refractive index not exceeding 1.7 for a central wavelength $\lambda_0$, which is defined by the following relation:

$$2/\lambda_0 = 1/\lambda_1 + 1/\lambda_2;$$

and wherein said multi-layered film is a five-layered film consisting, in the order from the surface of said substrate, of films of $SiO_2$, $MgF_2$, $Al_2O_3$, $SiO_2$ and $MgF_2$, with a respective optical thicknesses of ¼ of said central wavelength $\lambda_0$.

* * * * *

UNITED STATES PATENT AND TRADEMARK OFFICE
CERTIFICATE OF CORRECTION

PATENT NO. : 5,557,466

DATED : September 17, 1996

INVENTOR(S): MINORU OTANI ET AL.

Page 1 of 2

It is certified that error appears in the above-identified patent and that said Letters Patent is hereby corrected as shown below:

ON TITLE PAGE

[56] References Cited "1167701" should read --1-167701--;
"2127601" should read --2-127601--;
"2247601" should read --2-247601--;
"4333834" should read --4-333834--.

COLUMN 2

Line 12, "wavelengths," should read --wavelengths is formed--.

COLUMN 3

Line 59, "quarts" should read --quartz--.

COLUMN 4

Line 4, "BK" should read --BK7--.

COLUMN 5

Line 11, "$KD_2PD_4$" should read --$KD_2PO_4$--;

UNITED STATES PATENT AND TRADEMARK OFFICE
CERTIFICATE OF CORRECTION

PATENT NO. : 5,557,466

DATED : September 17, 1996

INVENTORS : MINORU OTANI ET AL.

It is certified that error appears in the above-identified patent and that said Letters Patent is hereby corrected as shown below:

<u>COLUMN 5 continued</u>

Line 41,   "fifth" should read --a fifth-- and "$MgF_2$" should read --$MgF_2$ film--.

<u>COLUMN 6</u>

Line 66,   delete "a".

<u>COLUMN 7</u>

Line 15,   delete "a".

<u>COLUMN 8</u>

Line 16,   delete "a".

Signed and Sealed this

Eighteenth Day of March, 1997

Attest:

BRUCE LEHMAN

*Attesting Officer*      *Commissioner of Patents and Trademarks*